United States Patent
Boelter

[11] Patent Number: 5,855,774
[45] Date of Patent: Jan. 5, 1999

[54] STORM DRAIN FILTER

[76] Inventor: Carl Boelter, 1120 Lincoln St., Oregoncity, Oreg. 97045

[21] Appl. No.: 826,020

[22] Filed: Mar. 28, 1997

[51] Int. Cl.$^6$ .................................................. B01D 35/02
[52] U.S. Cl. .............................. 210/155; 52/12; 210/162; 210/163; 210/232; 210/237; 210/248; 210/249; 210/323.1; 210/459; 210/484; 210/485; 404/2
[58] Field of Search .............................. 4/286, 289, 290, 4/291, 292; 52/12; 210/154, 155, 162, 163, 164, 166, 232, 237, 248, 249, 459, 484, 485, 323.1; 404/2–5

[56] References Cited

U.S. PATENT DOCUMENTS

| | | | |
|---|---|---|---|
| 4,935,132 | 6/1990 | Schaier | 210/163 |
| 5,284,580 | 2/1994 | Shyh | 210/163 |
| 5,297,367 | 3/1994 | Sainz | 52/12 |
| 5,405,539 | 4/1995 | Schneider | 210/747 |
| 5,480,254 | 1/1996 | Autry et al. | 404/2 |
| 5,632,889 | 5/1997 | Tharp | 210/165 |

Primary Examiner—Peter A. Hruskoci

[57] ABSTRACT

A storm drain filter (10) functioning to remove selected substances from water flowing through a municipal storm drain. The storm drain filter (10) has an absorption filter (18) functioning to absorb selectable substances from a liquid. The absorption filter (18) comprises an absorption filter frame (18A) enclosing an absorption filter absorbing material (18B) between pairs of at least two absorption filter longitudinal retainers (18C) and at least two absorption filter transverse retainers (18D). The at least two absorption filter longitudinal retainers (18C) and at least two absorption filter transverse retainers (18D) function to retain the absorption filter absorbing material (18B) within the absorption filter frame (18A). A tray (16) functions to support the absorption filter (18). The tray rear (16B) comprises at least one orifice (16BA) functioning to permit liquid to flow therethrough. The tray front (16D) and tray rear (16B) further comprises at least two tray front fastener hole (16DB) which functions to receive a tray holddown mean functioning to hold the filter in place. A rack (14) which functions to securely restrain at least two trays (16) in an alternating pattern. The rack (14) is inserted into the cage (12) having alternating placement of the at least two trays (16) allows large debris to pass through the storm drain filter (10). A cage (12) functions to receive the rack (14) therein. A sealing means is securely attached to an upper perimeter of the cage (12) functioning to seal the interface between the cage (12) and a drain device opening.

13 Claims, 9 Drawing Sheets

STORM DRAIN FILTER

BACKGROUND OF THE INVENTION

1. Field of the Invention

The present invention relates in general to waste water drainage systems. More particularly, the present invention relates to methods and apparatus utilized to remove contaminants by absorption from municipal storm drains.

1. Description of the Prior Art

Streets and highways channel runoff water into storm sewers which carry the runoff into water shed areas such as rivers, lakes, streams, etc. The storm sewers function to remove runoff water before the runoff accumulates to a level which causes damage or inconvenience. Contaminants carried by the runoff water are transported in to the lakes and streams along with the water. This contributes to the over all pollution of the watershed areas. Typically street runoff water is channeled to the edge of the street where at selected intervals a collection box is placed to remove the water from the street level to a subterranean sewer. The runoff water includes contaminants and debris. A large number of contaminants such as oil can be filtered out of the water. A simple passage of runoff water through a filter selected to remove pollutants will clog with debris in a short time requiring excessive maintenance and when the cloging is severe the purpose of the storm drain can be negated causing the runoff to backup above ground and flood surrounding area. A requirement for a contaminant filter is that the filter must be able to pass large debris through to prevent the filter from clogging, while removing the desired contaminants. A number of filters have been proposed which filter debris or provide a device that is easily cleaned when clogged. Governmental regulations have recently placed constraints on storm runoff to reduce the contribution of runoff water to the overall pollution of lakes and streams. Various filter systems have been proposed for use in storm drains but none remove contaminants through absorption.

Numerous innovations for Storm Drain Filter have been provided in the prior art that are described as follows. Even though these innovations may be suitable for the specific individual purposes to which they address, they differ from the present invention as hereinafter contrasted.

In U.S. Pat. No. 5,480,254, titled Storm Drain Box Filter and Method of Use, invented by James L. Autry and Jimmy N. Whitley, this invention is a box filter used in conjunction with newly constructed storm drains and the like to prevent undesirable amounts of sediment and other debris carrier by storm runoff from entering the storm drain. Upper and lower frames are provided with expanded metal interior and exterior sidewalls extending therebetween. The box-like structure has an open bottom, reinforcing plates adjacent the connection of a lift handle and corner braces to add rigidity to the system. An aggregate such as crushed stone is placed between the interior walls and exterior walls of the filter and acts as a filter media for the sediment of the debris. This filter is reusable without loss of its filtering qualities due to its rugged construction and back flushable filter medium.

The patented invention is a debris filter. It does not filter fluid contaminants. The present invention passes debris but filters fluid contaminants such as oil.

In U.S. Pat. No. 5,405,539, titled Storm Drain Filter System, invented by Thomas W. Schneider, a filter system for insertion and assembly in a storm drain collection box. The filter includes a frame having a removable back and legs for easy assembly in the storm drain collection box. The frame includes a bed portion which is telescopic so as to be expandable to accommodate the width of the collection box. A sheet of filter medium is placed on the filter bed and back, and the filter frame is then urged against the front of the collection box by pneumatic cylinders. Silt and other debris collects in the filter compartment until full, and then the excess drainage water overflows unrestricted over the back of the filter frame.

The patented invention filters storm water debris and silt through a trap comprising a mesh and a filter medium sheet. The patented invention is installed in existing storm drains. When the filter is full, water is permitted to by pass the filter. The patented invention does not absorb fluid contaminants. The filter medium is comprised of a sheet supported by a screen like structure. The filter medium is not absorbent. The present invention filter passes debris but filters absorbable fluid contaminants such as oil. Water is directed along a maze path of filters which absorb contaminants but permit debris to bypass the filter. The filters are supported on trays which are removable when the entire device is removed from the storm drain structure.

In U.S. Pat. No. 5,284,580, titled Refuse Collecting Frame for Sewer, invented by Shyh-Yuan Shyh, a refuse collecting frame for a drainage sewer, particularly a frame placed beneath a cover of a sewer drainage opening to accumulate refuse and permit easy disposal of refuse accumulated therein in order to prevent blockage of the sewer. The refuse collecting frame includes a frame body and a refuse collecting basin. The frame body is preferably a rectangular or cubic frame structure having a dimension corresponding to the opening of the sewer drain. A filtering net or a porous board with a plurality of penetrating holes is incorporated at each lateral side and bottom of the frame. A plurality of right-angled hangers are formed at spaced positions along the upper edges of an open upper side of the frame for firmly hanging the frame on a sewer opening by positioning the right-angled hangers on a stepped portion formed along edges of the sewer opening beneath a separate storm drain sump which has a fluid outlet through a wall of the sump, the filter includes a bag-like body member having a cylindrical body portion fabricated from resilient mesh-like synthetic material. A base portion of the filter defines a toroid-shaped section. A weighted material is placed within the toroid-shaped section. Wedge-shaped spacers are axially aligned and secured to an outer face of the cylindrical body portion of the filter. A suspension plate is secured to the body member to support the filter in the storm drain sump.

The patented invention functions to remove debris from storm drains. It does not have an absorbent means.

Numerous innovations for Storm Drain Filter have been provided in the prior art that are adapted to be used. Even though these innovations may be suitable for the specific individual purposes to which they address, they would not be suitable for the purposes of the present invention as heretofore described.

SUMMARY OF THE INVENTION

The present invention functions to filter contaminants from storm drains by passing the water through a series of filters comprising absorbent pads. The pads function to absorb the contaminants while permitting debris to flow through the filter. The absorbent pads are held in trays which are removably fastened to a frame. The frame has a flange which adapts the frame to fit various sizes of drains.

The types of problems encountered in the prior art are the filter function to prevent large debris from clogging the entrance and collect small water born particulate matter. The present invention is adapted to standard storm sewer drain collection boxes and functions to remove absorbable contaminants from runoff. The present invention passes runoff over multiple filters which are staggered such that the over flow from one filter flows on to a second filter.

In the prior art, unsuccessful attempts to solve this problem were attempted namely: cages and filters which remove debris but do not address absorbable contaminants such as oil. However, the problem was solved by the present invention because the present invention contains an absorption filter which removes contaminants.

Innovations within the prior art are rapidly being exploited as government regulation increasingly restricts the pollution allowed from all sources attached to watershed areas including municipalities.

The present invention solved a long felt need to remove vehicle droppings such an oil, fuel, and coolants from storm water runoff from roads.

Accordingly, it is an object of the present invention to provide filter which absorbs contaminants from storm water runoff.

More particularly, it is an object of the present invention to provide a filter adapted to standard sized municipal storm drain collection boxes that removes road runoff contaminants.

In keeping with these objects, and with others which will become apparent hereinafter, one feature of the present invention resides, briefly stated, in a cage which is inserted into a standard municipal collection box. The cage contains a removable filter rack which is easily removable for cleaning and changing of the filters.

When the storm drain filter is designed in accordance with the present invention, the storm drain filter removes vehicle droppings and other absorbable contaminants from runoff water before the runoff reaches the watershed areas.

In accordance with another feature of the present invention, a rack holding multiple filters is removable from the storm drain collection box for cleaning and maintenance.

Another feature of the present invention is that tray functions to hold the filters with in the rack.

Yet another feature of the present invention is that the tray has a rim extending above the filter level so that water collects in the tray and is filtered through the filter material.

Still another feature of the present invention is that openings are located in the tray wall which permits excess fluid to flow into the next tray, thus the filter is self regulating.

Yet still another feature of the present invention is that the tray rim is sufficiently high to cause incoming water to collect above the filter.

Still yet another feature of the present invention is that the rim permits debris to over flow the tray with out lodging and causing an obstruction in the collection box.

Another feature of the present invention is that the filters are interchangeable and removable.

Yet another feature of the present invention is that it can be adapted to any cross section opening and size by configuration of a gasket or the shape of the tray, cage and filter.

Still another feature of the present invention is that the present invention is easily cleaned with out heavy equipment.

Yet another feature of the present invention is that the filtering capacity is tailored by selecting the number of filter trays.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing(s).

BRIEF LIST OF REFERENCE NUMERALS UTILIZED IN THE DRAWING

10—storm drain filter (10)
12—cage (12)
12A—cage top right side (12A)
12B—cage top rear (12B)
12C—cage top left side (12C)
12D—cage top front (12D)
12E—cage right front vertical member (12E)
12F—cage lower front (12F)
12G—cage lower left side (12G)
12H—cage left front vertical (12H)
12I—cage left rear vertical (12I)
12J—cage lower rear (12J)
12K—cage right rear vertical (12K)
12L—cage rear mid vertical member (12L)
12M—cage right mid vertical member (12M)
12N—cage front mid vertical member (12N)
12O—cage left mid vertical member (12O)
12P—cage lower right side (12P)
14—rack (14)
14A—rack top right side (14A)
14B—rack top rear (14B)
14BA—rack top rear handle (14BA)
14DA—rack top front handle (14DA)
14C—rack top left side (14C)
14D—rack top front (14D)
14E—rack right front vertical member (14E)
14F—rack lower front (14F)
14G—rack lower left side (14G)
14H—rack left front vertical (14H)
14I—rack left rear vertical (14I)
14J—rack lower rear (14J)
14K—rack right rear vertical (14K)
14L—rack left filter support (14L)
14LA—rack left filter support top flange (14LA)
14LB—rack left filter support vertical (14LB)
14LC—rack left filter support lower flange (14LC)
14LD—rack left filter support stop (14LD)
14M—rack right filter support (14M)
14MA—rack right filter support top flange (14MA)
14MB—rack right filter support vertical (14MB)
14MC—rack right filter support lower flange (14MC)
14MD—rack right filter support stop (14MD)
14N—rack insertion and removal direction (14N)
14O—rack lower right side (14O)
16—tray (16)
16A—tray right side (16A)
16AA—tray right side orifice (16AA)
16B—tray rear (16B)
16BA—tray rear orifice (16BA)
16BB—tray rear fastener hole (16BB)
16C—tray left side (16C)
16CA—tray left side orifice (16CA)
16D—tray front (16D)
16DA—tray front orifice (16DA)
16DB—tray front fastener hole (16DB)
16E—tray bottom (16E)

18—absorption filter (18)
18A—absorption filter frame (18A)
18B—absorption filter absorbing material (18B)
18C—absorption filter longitudinal retainer (18C)
18D—absorption filter transverse retainer (18D)
20—absorption filter hold down (20)
20A—absorption filter hold down head (20A)
20B—absorption filter hold down shank (20B)
20C—absorption filter hold down clip (20C)
22—gasket (22)
22A—gasket front (22A)
22B—gasket right (22B)
22C—gasket rear (22C)
22D—gasket left (22D)

SECOND EMBODIMENT

110—pipe storm drain filter (110)
112—pipe cage (112)
112A—pipe cage upper end (112A)
112B—pipe cage first vertical member (112B)
112C—pipe cage second vertical member (112C)
112D—pipe cage third vertical member (112D)
112E—pipe cage lower end (112E)
112F—pipe rack upper retainer (112F)
112G—pipe rack lower retainer (112G)
114—pipe rack (114)
114A—pipe rack upper end (114A)
114B—pipe rack first vertical support (114B)
114BA—pipe rack first vertical support first filter holder (114BA)
114BAA—pipe rack first vertical support first filter holder top flange (114BAA)
114BAB—pipe rack first vertical support first filter holder vertical (114BAB)
114BAC—pipe rack first vertical support first filter holder lower flange (114BAC)
114BB—pipe rack first vertical support second filter holder (114BB)
114C—pipe rack second vertical support (114C)
114CA—pipe rack second vertical support first filter holder (114CA)
114CB—pipe rack second vertical support second filter holder (114CB)
114D—pipe rack third vertical support (114D)
114DA—pipe rack third vertical support first filter holder (114DA)
114DB—pipe rack third vertical support second filter holder (114DB)
114E—pipe rack lower end (114E)
114F—pipe rack releaseable vertical support (114F)
114FA—pipe rack releaseable vertical support first filter holder (114FA)
114FAA—pipe rack releaseable vertical support first filter holder top flange (114FAA)
114FAB—pipe rack releaseable vertical support first filter holder vertical (114FAB)
114FAC—pipe rack releaseable vertical support first filter holder bottom flange (114FAC)
114FB—pipe rack releaseable vertical support second filter holder (114FB)
114GA—upper retainer (114GA)
114GB—lower retainer (114GB)
116—pipe absorption filter (116)
116A—pipe absorption filter retaining rim (116A)
116B—pipe absorption filter absorption material (116B)
116C—pipe absorption filter first cross member (116C)
116D—pipe absorption filter second cross member (116D)
116E—pipe absorption filter edge (116E)
116F—insertion/extraction direction (116F)
118—fastener (118)
120—retainer fastener (120)
120A—retainer fastener head (120A)
120B—retainer fastener shank (120B)
120C—retainer fastener clip (120C)
122—pipe gasket (122)

BRIEF DESCRIPTION OF THE PREFERRED EMBODIMENT

DETAILED DESCRIPTION OF THE PREFERRED EMBODIMENT

Figure 1:
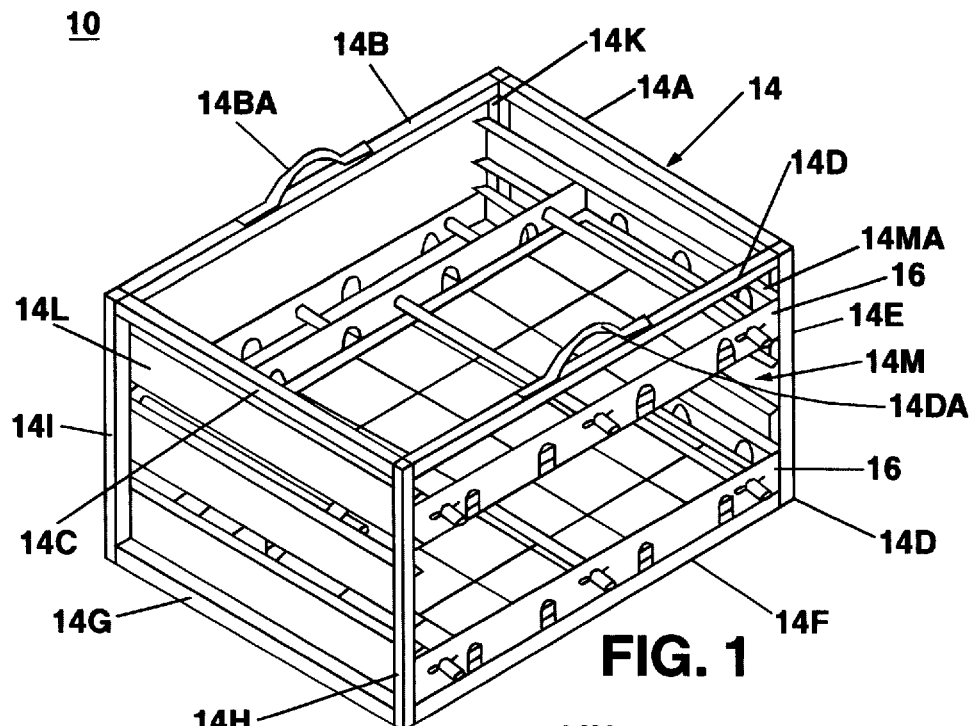
FIG. 1 is a perspective view of a rack containing a tray.

Firstly, referring to FIG. 1 which is a perspective view of a rack (14) containing a tray (16). A rack (14) functions to securely restrain at least two trays (16) in an alternating pattern. The rack (14) is inserted into a cage (12). The rack (14) comprises a rack top right side (14A) having a front end and rear end. The rear end of the rack (14) is securely attached to a right end of a rack top rear (14B). The left end of the rack top rear (14B) is securely attached to a rear end of a rack top left side (14C). A front end of the rack top left side (14C) is securely attached to a left end of a rack top front (14D). A right end of the a rack top front (14D) is securely attached to a front end of the rack top right side (14A). The rack top right side (14A) comprises a rack top rear handle (14BA) securely attached thereto functioning as a handhold when removing the rack (14) from the cage (12). The rack top front (14D) comprises a rack top front handle (14DA) securely attached thereto functioning as a handhold when removing the rack (14) from the cage (12). An upper end of a rack right front vertical member (14E) is securely attached to an intersection of the rack top right side (14A) and the rack top front (14D). A lower end of the rack right front vertical member (14E) is securely attached to a right end of a rack lower front (14F) and a front end of a rack lower right side (14O). A left end of the rack lower front (14F) is securely attached to a front end of a rack lower left side (14G) and lower end of a rack left front vertical (14H). The rack left front vertical (14H) is securely attached at an upper end to the left end of a rack top front (14D) and the front end of the rack top left side (14C). A rear end of the rack lower left side (14G) is securely attached to a lower end of a rack left rear vertical (14I) and a left end of a rack lower rear (14J). An upper end of the rack left rear vertical (14I) is securely attached to the left end of the rack top rear (14B) and the rear end of the rack top left side (14C). A right end of the rack lower rear (14J) is securely attached to a rear end of the rack lower right side (14O) and to a lower end of a rack right rear vertical (14K). An upper end of the rack right rear vertical (14K) is securely attached to the rear end of the rack top right side (14A) and the right end of rack top rear (14B).

At least one rack right filter support (14M) is securely attached between the rack right front vertical member (14E) and the rack right rear vertical (14K). The at least one rack right filter support (14M) is substantially parallel to the rack top right side (14A). The rack right filter support (14M) comprises a rack right filter support top flange (14MA) securely attached at one distal edge to a proximal edge of a rack right filter support vertical (14MB). The distal edge of the rack right filter support vertical (14MB) is securely attached to a proximal edge of a rack right filter support lower flange (14MC). The rack right filter support (14M) further comprises a rack right filter support stop (14MD). The rack right filter support stop (14MD) function to limit the distance the tray (16) can be inserted. The rack right filter support (14M) functions to support a right end of the tray (16).

At least one rack left filter support (14L) s is securely attached between the rack left front vertical (14H) and the rack left rear vertical (14I). The at least one rack left filter support (14L) is substantially parallel to the rack top left side (14C). The rack left filter support (14L) which comprises a rack left filter support top flange (14LA) securely attached at one distal edge to a proximal edge of a rack left filter support vertical (14LB). The distal edge of the rack left filter support vertical (14LB) is securely attached to a proximal edge of a rack left filter support lower flange (14LC). The rack left filter support (14L) further comprises a rack left filter support stop (14LD). The rack left filter support (14L) functions to support the tray (16). The rack left filter support stop (14LD) function to limit the distance the tray (16) can be inserted. The rack left filter support (14L) functions to support a left end of the tray (16). Further the alternating placement of the at least two trays (16) allows large debris to pass through the storm drain filter (10).

Figure 2:
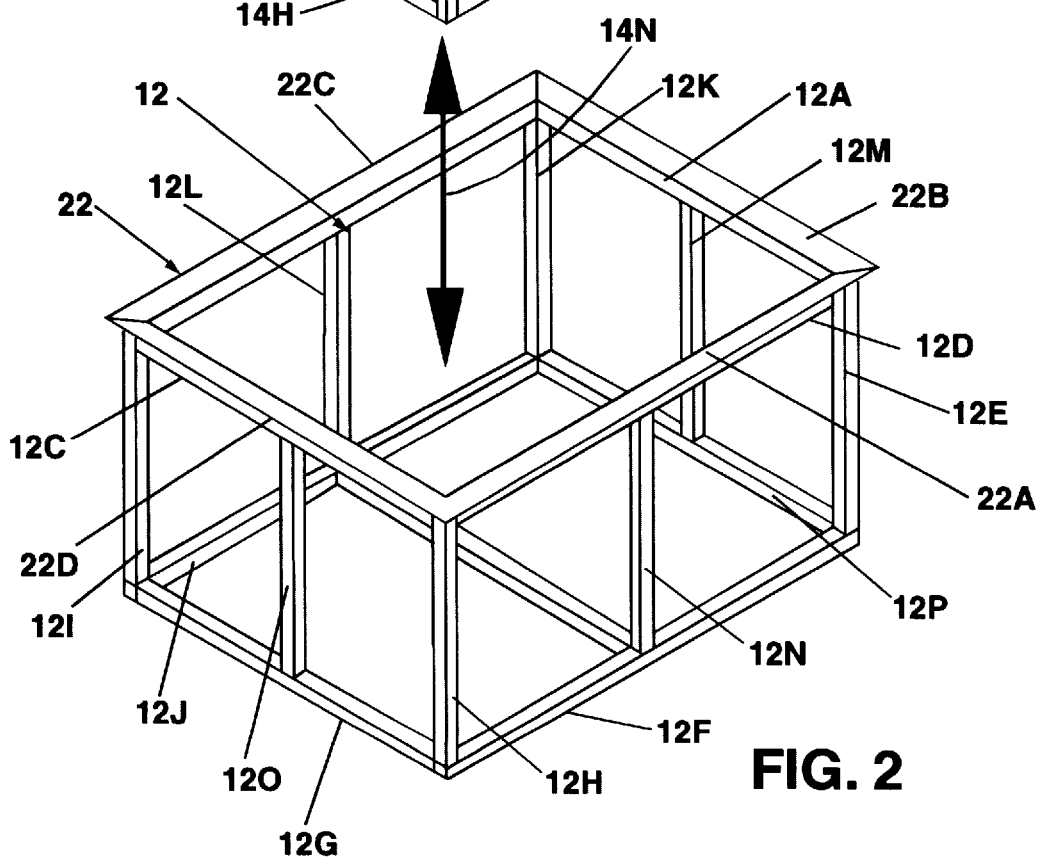
FIG. 2 is a perspective view of a cage.

Secondly, referring to FIG. 2 which is a perspective view of a cage (12). The cage (12) functions to receive the rack (14) therein. The cage (12) comprises a cage top right side (12A). The cage top right side (12A) back end is securely attached a right end of a cage top rear (12B). A left end of the cage top rear (12B) is securely attached to a back end of a cage top left side (12C). A front end of the cage top left side (12C) is securely attached to a left end of a cage top front (12D). A right end of the cage top front (12D) is securely attached to a front end of the cage top right side (12A). The front end of the cage top front (12D) is further securely attached to an upper end of a cage right front vertical member (12E). A lower end of the cage right front vertical member (12E) is securely attached to a right end of a cage lower front (12F). A left end of the cage lower front (12F) is securely connected to a front end of a cage lower left side (12G) and a lower end of a cage left front vertical (12H). An upper end of the cage left front vertical (12H) is securely attached to a left end of the cage top front (12D) and to a front end of the cage top left side (12C). A back end of the cage lower left side (12G) is securely attached to lower end of a cage left rear vertical (12I) and a left end of a cage lower rear (12J). A right end of the cage lower rear (12J) is securely attached to the back end of a cage lower right side (12P) and a lower end of a cage right rear vertical (12K). An upper end of the cage left rear vertical (12I) is securely attached to the left end of the cage top rear (12B) and the back end of a cage top left side (12C). A cage rear mid vertical member (12L) is securely attached at an upper end to a midpoint of the cage top rear (12B) and at a lower end to a midpoint of the cage lower rear (12J). A cage right mid vertical member (12M) is securely attached at an upper end to a midpoint of the cage top right side (12A) and at a lower end to a midpoint of the cage lower right side (12P). A cage front mid vertical member (12N) is securely attached at an upper end to a midpoint of the cage top front (12D) and at a lower end to a midpoint of the cage lower front (12F). A cage left mid vertical member (12O) is securely attached at an upper end to a midpoint of the cage top left side (12C) and at a lower end to a midpoint of the cage lower left side (12G).

When the rack (14) is inserted into the cage (12) along a rack insertion and removal direction (14N) the cage rear mid vertical member (12L), the cage right mid vertical member (12M), the cage front mid vertical member (12N) and the cage left mid vertical member (12O) prevent the at least two trays (16) form dislodging.

A gasket (22) is securely attached to an upper perimeter of the cage (12) functioning to seal the interface between the cage (12) and a drain device opening. The gasket (22) which comprises a gasket front (22A) securely attached at an inner edge to a top edge of the cage top front (12D). A gasket right (22B) is securely attached at an inner edge to a top edge of the cage top right side (12A). A gasket rear (22C) securely attached at an inner edge to a top edge of the cage top rear (12B). A gasket left (22D) securely attached at an inner edge to a top edge of the cage top left side (12C).

Figure 3:
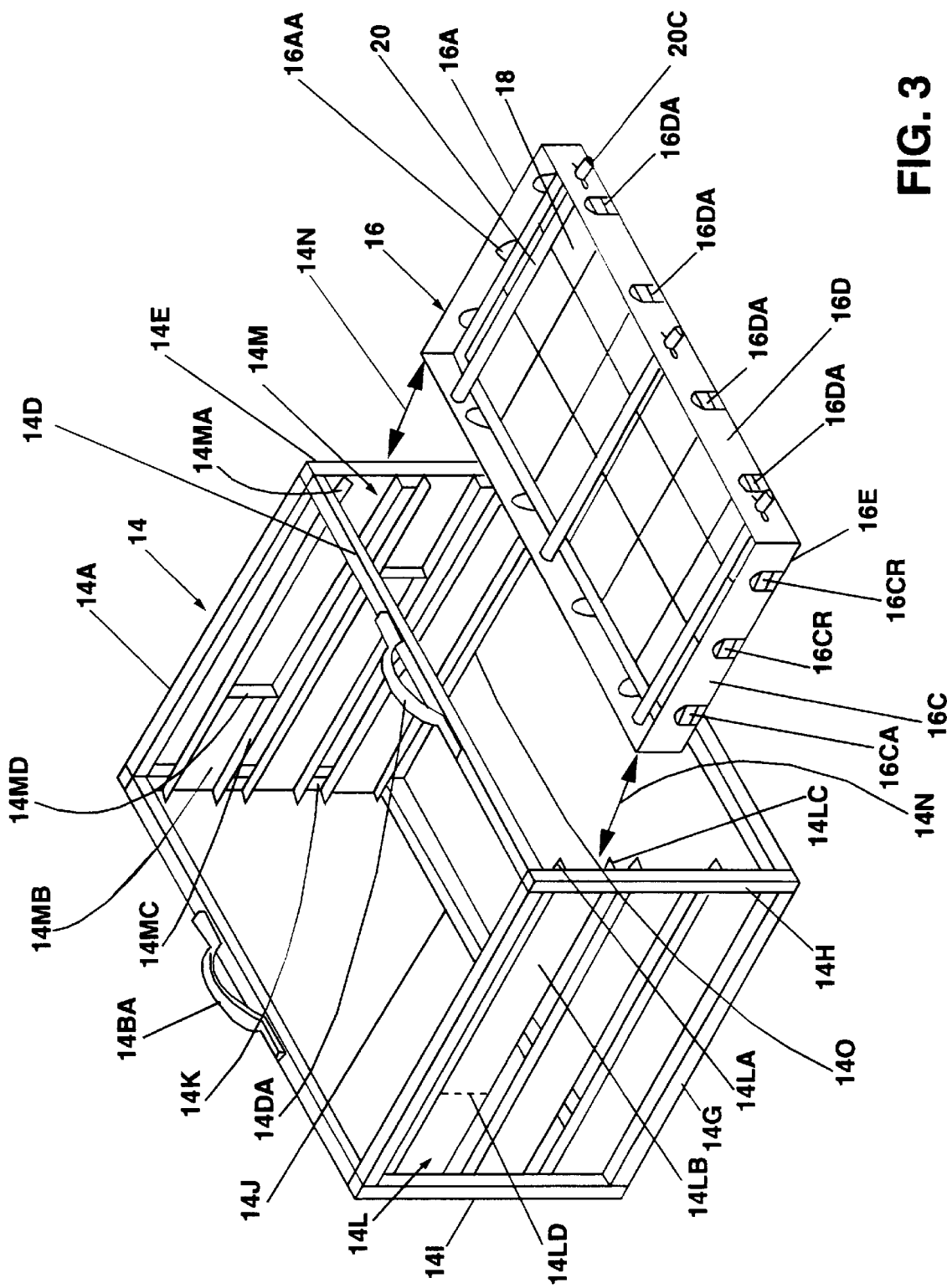
FIG. 3 is a perspective view of a tray and rack with an absorption filter.

Thirdly, referring to FIG. 3 which is a perspective view of a tray (16) and rack (14) with an absorption filter (18). The tray (16) functions to support the absorption filter (18). The tray (16) comprises a tray right side (16A) having at least one tray right side orifice (16AA) for liquid to flow therethrough. The tray right side (16A) having a front and back is securely attached to a right end of a tray rear (16B). The tray rear (16B) comprises at least one tray rear orifice (16BA) functioning to permit liquid to flow therethrough. The tray rear (16B) further comprises a tray rear fastener hole (16BB) which functions to receive a tray holddown means. A right end of the tray rear (16B) is securely attached to a rear end of a tray left side (16C) which comprises at least one tray left side orifice (16CA) functioning to permit liquid to flow therethrough. A front end of the tray left side (16C) is securely attached to a left end of a tray front (16D). The tray front (16D) comprises at least one tray front orifice (16DA) functioning to permit liquid to flow therethrough.

The tray front (16D) further comprises at least one tray front fastener hole (16DB) which functions to receive a tray holddown means. A tray bottom (16E) constructed from a mesh material is securely attached at a peripheral edge to a lower edge of the tray right side (16A), lower edge of the tray left side (16C), lower edge of the tray front (16D) and a lower edge of the tray rear (16B). The at least one tray right side orifice (16AA), at least one a tray rear orifice (16BA), at least one tray left side orifice (16CA) and the at least one tray front orifice (16DA) function to permit a preselected volume of liquid to flow therethrough causing contaminants to be absorbed by the absorption filter (18). Volume in excess of a preselected value overflows the upper edge of the tray right side (16A), tray rear (16B), tray left side (16C) and the tray front (16D) preventing the storm drain filter (10) from excessive restricting of liquid flow therethrough.

An absorption filter (18) functions to absorb selectable substances from a liquid. The absorption filter (18) comprises an absorption filter frame (18A) enclosing an absorption filter absorbing material (18B) between pairs of at least two absorption filter longitudinal retainers (18C) and at least two absorption filter transverse retainers (18D). The at least two absorption filter longitudinal retainers (18C) and at least two absorption filter transverse retainers (18D) function to retain the absorption filter absorbing material (18B) within the absorption filter frame (18A).

Figure 4:
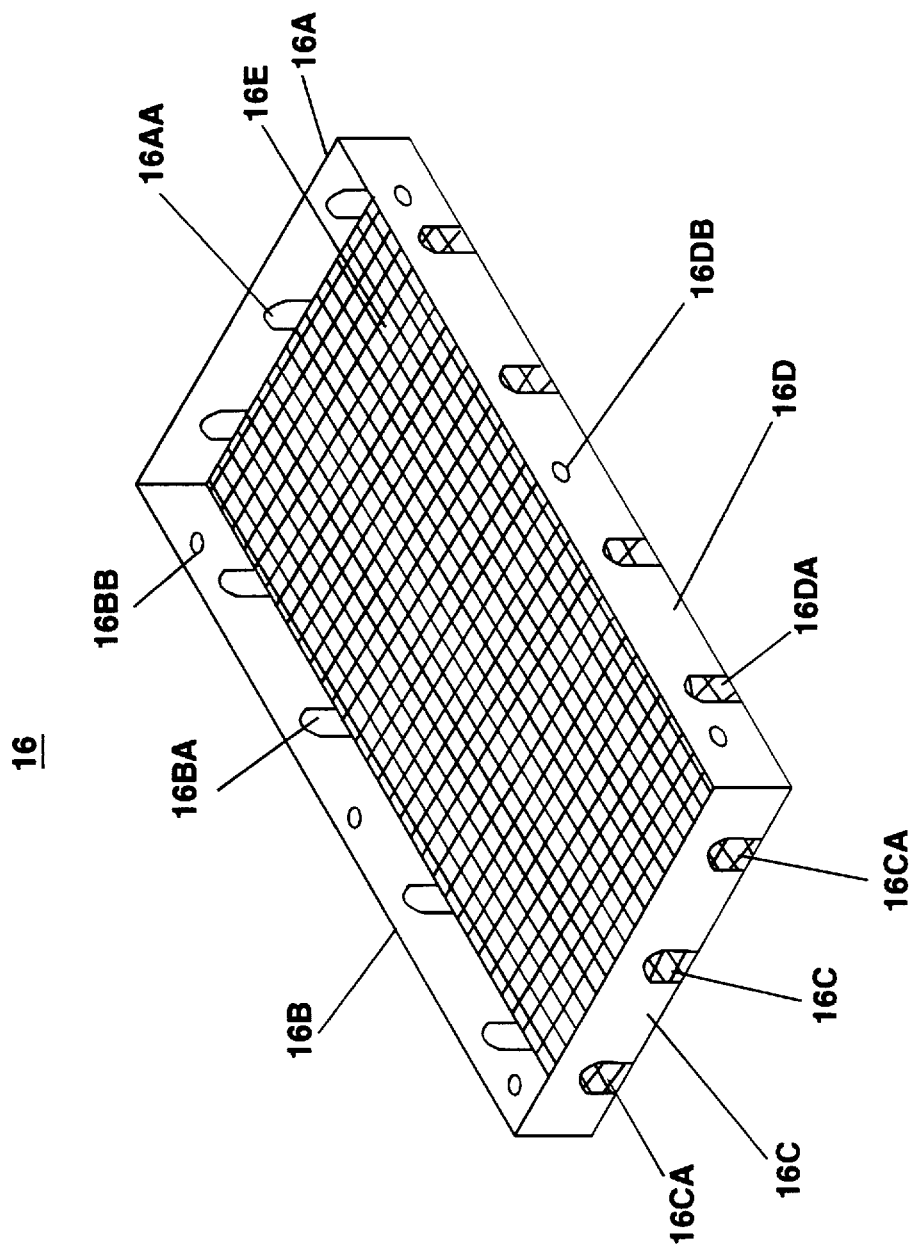
FIG. 4 is a perspective view of a tray with out an absorption filter.

Fourthly, referring to FIG. 4 which is a perspective view of a tray (16) with out an absorption filter (18). A tray (16) which functions to support the absorption filter (18). The tray (16) comprises a tray right side (16A) having at least one tray right side orifice (16AA) for liquid to flow therethrough. The tray right side (16A) having a front and back is securely attached to a right end of a tray rear (16B). The tray rear (16B) comprises at least one tray rear orifice (16BA) functioning to permit liquid to flow therethrough. The tray rear (16B) further comprises a tray rear fastener hole (16BB) which functions to receive a tray holddown means. A right end of the tray rear (16B) is securely attached to a rear end of a tray left side (16C) which comprises at least one tray left side orifice (16CA) functioning to permit liquid to flow therethrough. A front end of the tray left side (16C) is securely attached to a left end of a tray front (16D). The tray front (16D) comprises at least one tray front orifice (16DA) functioning to permit liquid to flow therethrough. The tray front (16D) further comprises at least one tray front fastener hole (16DB) which functions to receive a tray holddown means, A tray bottom (16E) constructed from a mesh material is securely attached at a peripheral edge to a lower edge of the tray right side (16A) and a lower edge of the tray left side (16C) and a lower edge of the tray front (16D) and a lower edge of the tray rear (16B). The at least one tray right side orifice (16AA) and at least one tray rear orifice (16BA) and at least one tray left side orifice (16CA) and the at least one tray front orifice (16DA) function to permit a preselected volume of liquid to flow therethrough causing contaminants to be absorbed by the absorption filter (18). Volume in excess of a preselected value overflows the upper edge of the tray right side (16A) and the tray rear (16B) and the tray left side (16C) and the tray front (16D) preventing the storm drain filter (10) from excessively restricting the liquid flow therethrough.

Figure 5:
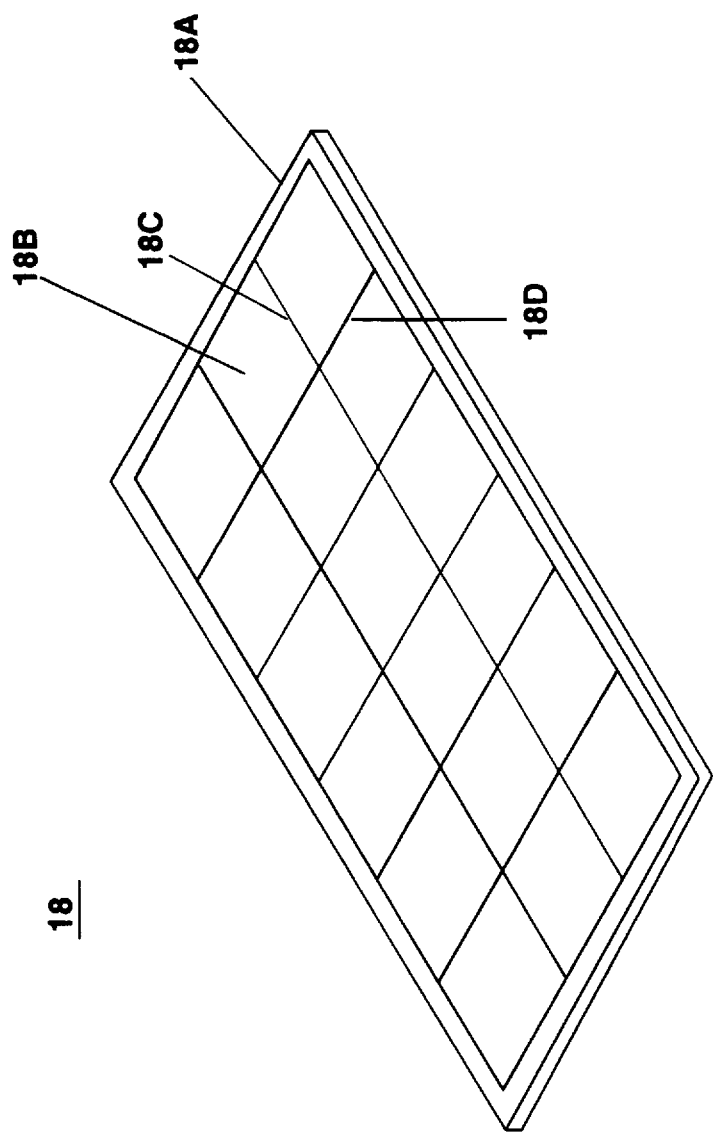
FIG. 5 is a perspective view of an absorption filter.

Now, referring to FIG. 5 which is a perspective view of an absorption filter (18) functioning to absorb selectable substances from a liquid. The absorption filter (18) comprises an absorption filter frame (18A) enclosing an absorption filter absorbing material (18B) between pairs of at least two absorption filter longitudinal retainers (18C) and at least two absorption filter transverse retainers (18D). The at least two absorption filter longitudinal retainers (18C) and at least two absorption filter transverse retainers (18D) function to retain the absorption filter absorbing material (18B) within the absorption filter frame (18A).

Figure 6:
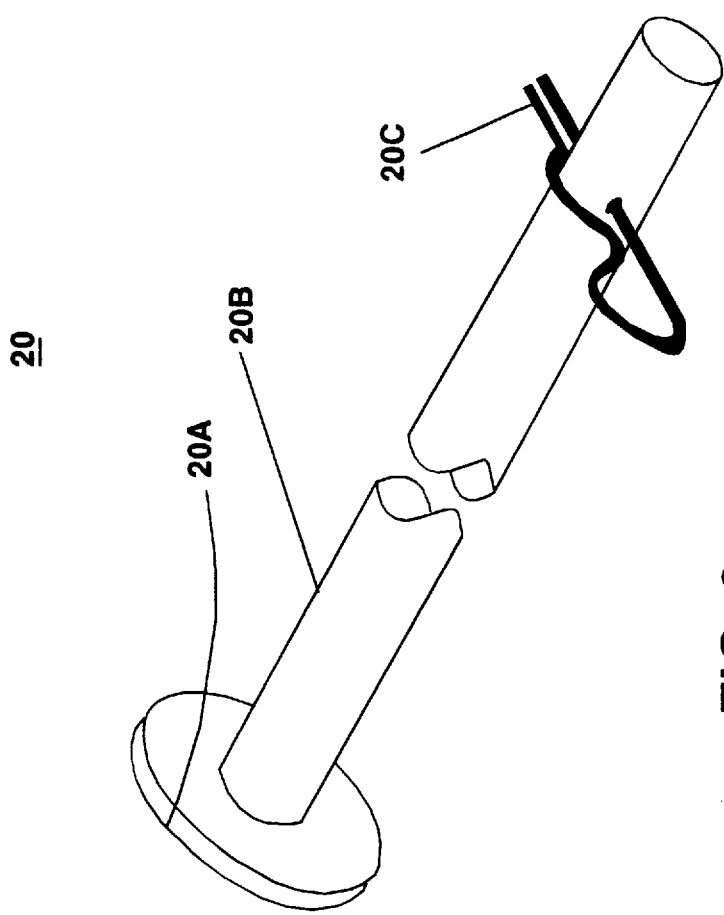
FIG. 6 is a perspective view of an absorption filter hold down.

Now, referring to FIG. 6 which is a perspective view of an absorption filter hold down (20). The absorption filter hold down (20) comprises an absorption filter hold down head (20A) securely attached to one end of an absorption filter hold down shank (20B). The absorption filter hold down shank (20B) has an aperture in an opposite end adapted to receive an absorption filter hold down clip (20C) therethrough.

Figure 7:
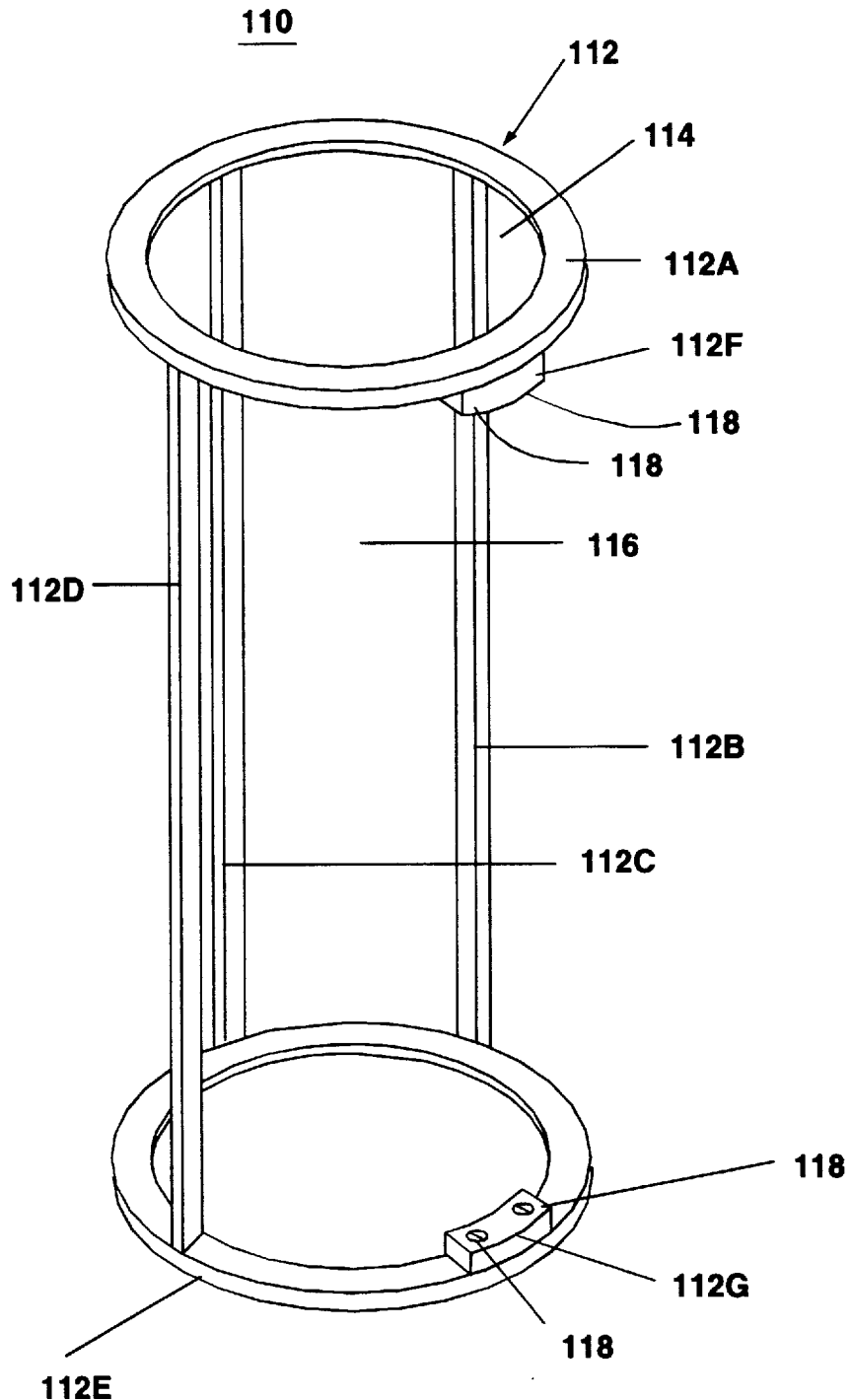
FIG. 7 is a perspective view of a pipe cage.

Now, referring to FIG. 7 which is a perspective view of a pipe cage (112) which functions to retain the pipe rack (114) therein. The pipe cage (112) comprises a pipe cage upper end (112A) which is circular in configuration having a pipe cage upper end central aperture therein. The pipe cage upper end central aperture functions to receive a liquid flow. The pipe cage upper end (112A) is securely attached to the upper end of a pipe cage first vertical member (112B). The lower end of the pipe cage first vertical member (112B) is securely attached to a pipe cage lower end (112E). The pipe cage upper end (112A) is securely attached to the upper end of a pipe cage second vertical member (112C). The lower end of the pipe cage second vertical member (112C) is securely attached to a pipe cage lower end (112E). The pipe cage upper end (112A) is securely attached to the tipper end of a pipe cage third vertical member (112D). The lower end of the pipe cage third vertical member (112D) is securely attached to a pipe cage lower end (112E).

The pipe cage lower end (112E) is a circular ring in configuration and has a pipe cage upper end central aperture therein. The pipe cage lower end central aperture functions to discharge a liquid flow. The pipe rack (114) is retained within the pipe cage (112) by a pipe rack upper retainer (112F) which is securely attached to the pipe cage upper end (112A) and a pipe rack lower retainer (112G) which is securely attached to a pipe cage lower end (112E).

A pipe gasket (122) is securely attached to the perimeter of the pipe cage upper end (112A). The pipe gasket (122) functions to seal the pipe cage upper end (112A) to a pipe end. The pipe gasket (122) is selected from a group consisting of rubber, glue, epoxy, expandable foam, polyurethane, plastic, metal, metal alloy, concrete, and plastic composite.

Figure 8:
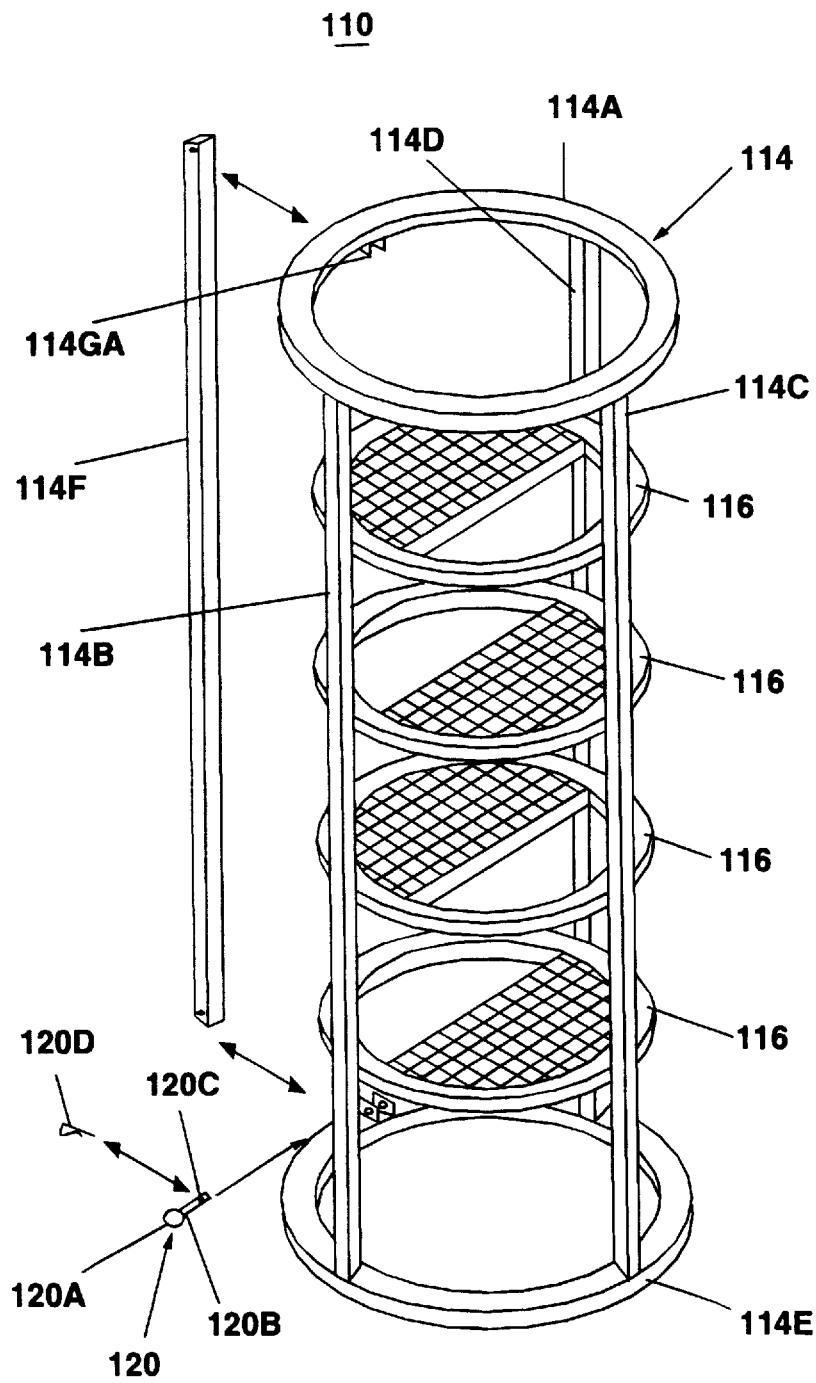
FIG. 8 is a perspective view of a pipe rack.

Now, referring to FIG. 8 which is a perspective view of a pipe rack (114) which functions to retain at least one pipe absorption filter (116) in an alternating pattern. The pipe rack (114) rack comprises a pipe rack upper end (114A) which is circular having a central aperture. The central aperture functions to receive a liquid flow.

The pipe rack upper end (114A) is securely attached to an upper end of a pipe rack first vertical supports (114B). A lower end of the pipe rack first vertical support (114B) is securely attached to a pipe rack lower end (114E).

The pipe rack first vertical supports (114B) is securely attached to a pipe rack first vertical support second filter holder (114BB) which is 'U' shaped in cross section and functions to retain at least one pipe absorption filter (116). The pipe rack first vertical support second filter holder (114BB) is substantially the same as the pipe rack first vertical support first filter holder (114BA)

The pipe rack upper end (114A) is securely attached to an upper end of a pipe rack second vertical support (114C). A lower end of the pipe rack second vertical support (114C) is securely attached to a pipe rack lower end (114E).

The pipe rack upper end (114A) is securely attached to an upper end of a pipe rack third vertical support (114D). A lower end of the pipe rack third vertical support (114D) is securely attached to a pipe rack lower end (114E).

The pipe rack lower end (114E) which is circular having a central aperture. The central aperture functions to discharge a liquid flow.

The pipe rack releasable vertical support (114F) is demountably fastened at an upper end to an upper retainer (114GA) and the pipe rack releasable vertical support (114F) is demountably fastened at a lower end to a lower retainer (114GB) by at least one retainer fastener (120) having a retainer fastener head (120A) securely attached at one distal end to a retainer fastener shank (120B). The retainer fastener shank (120B) comprises an aperture at an opposite distal end adapted to receive a retainer fastener clip (120C).

The upper retainer (114GA) is securely attached to the pipe rack upper end (114A) by a fastening means. The lower retainer (114GB) is securely attached to the pipe rack lower end (114E) by a fastening means.

Figure 9:
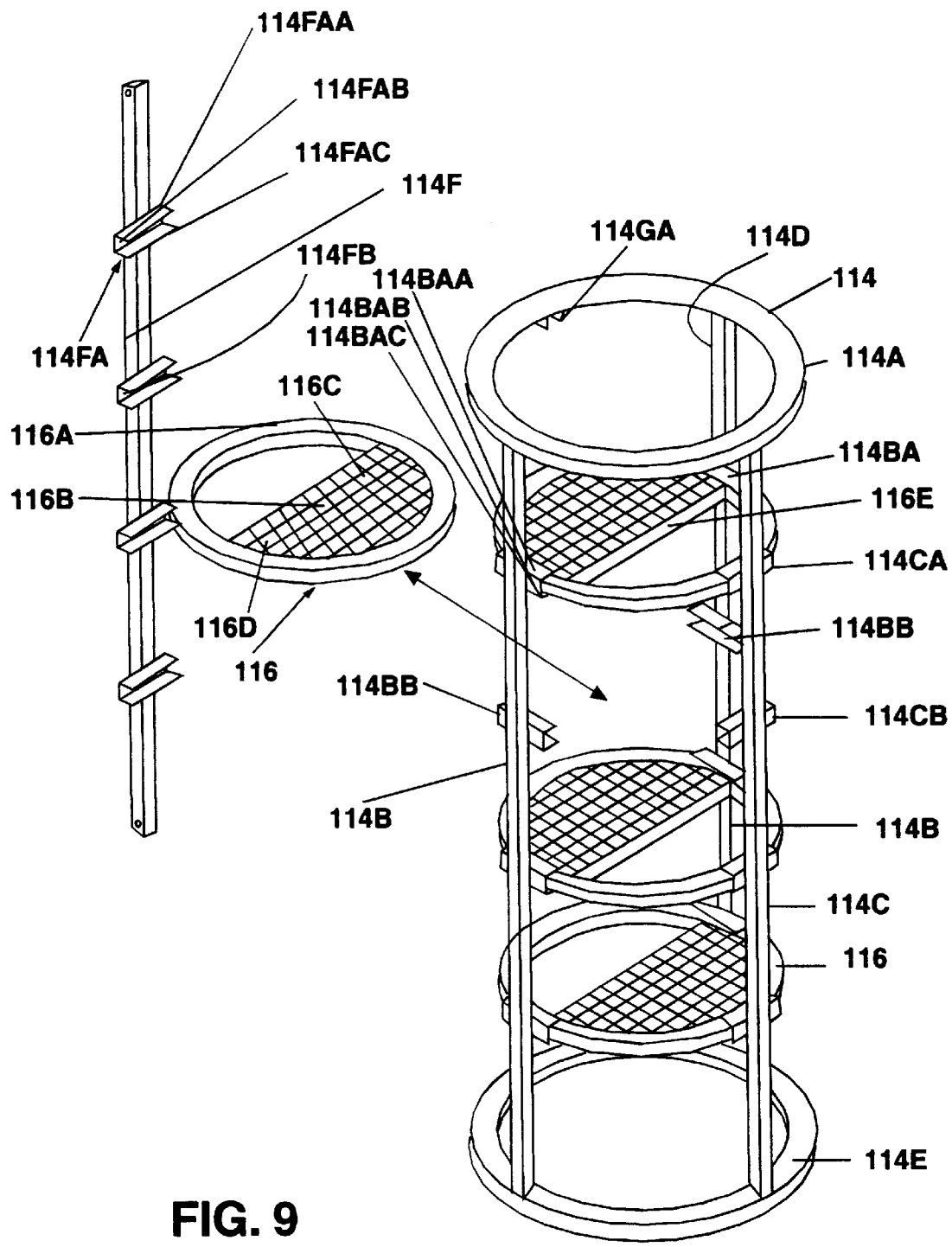
FIG. 9 is a perspective view of a pipe rack and pipe absorption filter.

The fastening means is selected from a group consisting of screws, welding, bolts, hook and loop, glue, and bonding, Now, referring to FIG. 9 which is a perspective view of a pipe rack (114) and pipe absorption filter (116). The pipe rack (114) which functions to retain at least one pipe absorption filter (116) in an alternating pattern. The pipe rack (114) rack comprises a pipe rack upper end (114A) which is circular having a central aperture. The central aperture functions to receive a liquid flow.

The pipe rack upper end (114A) is securely attached to an upper end of a pipe rack first vertical supports (114B). A lower end of the pipe rack first vertical support (114B) is securely attached to a pipe rack lower end (114E). The pipe rack first vertical supports (114B) is securely attached to a pipe rack first vertical support first filter holder (114BA) which is 'U' shaped in cross section and functions to retain at least one pipe absorption filter (116). The pipe rack first vertical support first filter holder (114BA) comprises a pipe rack first vertical support first filter holder top flange (114BAA) is rectangular in shape. an inner edge of the pipe rack first vertical support first filter holder top flange (114BAA) is securely attached at right angles to an upper edge of a pipe rack first vertical support first filter holder vertical (114BAB). A lower edge of the pipe rack first vertical support first filter holder vertical (114BAB) is securely attached to an inner edge of a pipe rack first vertical support first filter holder lower flange (114BAC).

The pipe rack first vertical supports (114B) is securely attached to a pipe rack first vertical support second filter holder (114BB) which is 'U' shaped in cross section and functions to retain at least one pipe absorption filter (116). The pipe rack first vertical support second filter holder (114BB) is substantially the same as the pipe rack first vertical support first filter holder (114BA)

The pipe rack upper end (114A) is securely attached to an upper end of a pipe rack second vertical support (114C). A lower end of the pipe rack second vertical support (114C) is securely attached to a pipe rack lower end (114E). The pipe rack second vertical support (114C) comprises a pipe rack second vertical support first filter holder (114CA) which functions to retain the pipe absorption filter (116). The pipe rack second vertical support (114C) further comprises a pipe rack second vertical support second filter holder (114CB) which functions to retain at least one pipe absorption filter (116).

The pipe rack upper end (114A) is securely attached to an upper end of a pipe rack third vertical support (114D). A lower end of the pipe rack third vertical support (114D) is securely attached to a pipe rack lower end (114E). The pipe rack third vertical support (114D) is securely attached to a pipe rack third vertical support first filter holder (114DA) which functions to retain the pipe absorption filter (116). The pipe rack third vertical support (114D) is securely attached to a pipe rack third vertical support second filter holder (114DB) which functions to retain at least one pipe absorption filter (116).

The pipe rack lower end (114E) which is circular having a central aperture. The central aperture functions to discharge a liquid flow. A pipe rack releasable vertical support (114F) is securely attached to a pipe rack releasable vertical support first filter holder (114FA) which is 'U' shaped. The pipe rack releasable vertical support first filter holder (114FA) comprises a pipe rack releaseable vertical support first filter holder top flange (114FAA), an inner edge of the pipe rack releasable vertical support first filter holder top flange (114FAA) is securely attached to an upper edge of a pipe rack releasable vertical support first filter holder vertical (114FAB). The lower edge of the pipe rack releaseable vertical support first filter holder vertical (114FAB) is securely attached to inner edge of a pipe rack releaseable vertical support first filter holder bottom flange (114FAC). The pipe rack releaseable vertical support first filter holder (114FA) functions to removably retain a pipe absorption filter (116) between the pipe rack releaseable vertical support first filter holder top flange (114FAA) and the pipe rack releaseable vertical support first filter holder bottom flange (114FAC).

The pipe rack releasable vertical support (114F) further, is securely attached to a pipe rack releaseable vertical support second filter holder (114FB) which is 'U' shaped and substantially the same as the pipe rack releaseable vertical support first filter holder (114FA).

The pipe rack releasable vertical support (114F) is demountably fastened at an upper end to an upper retainer (114GA) and the pipe rack releasable vertical support (114F) is demountably fastened at a lower end to a lower retainer (114GB) by at least one retainer fastener (120) having a retainer fastener head (120A) securely attached at one distal end to a retainer fastener shank (120B). The retainer fastener shank (120B) comprises an aperture at an opposite distal end adapted to receive a retainer fastener clip (120C).

The upper retainer (114GA) is securely attached to the pipe rack upper end (114A) by a fastening means. The lower retainer (114GB) is securely attached to the pipe rack lower end (114E) by a fastening means.

The fastening means is selected from a group consisting of screws, welding, bolts, hook and loop, glue, and heat bonding, The pipe rack first vertical support first filter holder (114BA) comprises a pipe rack first vertical support first filter holder top flange (114BAA) having an inner edge which is securely attached to an upper edge of a pipe rack first vertical support first filter holder vertical (114BAB). A lower edge of the rack right filter support vertical (114BAB) is securely attached to an inner edge of a pipe rack first vertical support first filter holder t lower flange (114BAC). The pipe rack first vertical support first filter holder (114BA) functions to removably retain a pipe absorption filter (116) between the first vertical support first filter holder top flange (114BAA) and the pipe rack first vertical support first filter holder lower flange (114BAC).

The pipe absorption filter (116) comprises a pipe absorption filter retaining rim (116A) which securely encloses a pipe absorption filter absorption material (116B) having a pipe absorption filter edge (116E). The pipe absorption filter absorption material (116B) functions to remove selected substance from a liquid. The pipe absorption filter absorption material (116B) is securely restrained by at least one pipe absorption filter first cross member (116C) and at least one a pipe absorption filter second cross member (116D) oriented at right angles to each other and securely attached to the pipe absorption filter retaining rim (116A) at opposite distal ends. The pipe absorption filter absorption material (116B) extends partially across the pipe absorption filter retaining rim (116A) limited by the pipe absorption filter edge (116E). The pipe absorption filter (116) is inserted into the pipe rack (114) along an insertion/extraction direction (116F).

Figure 10:
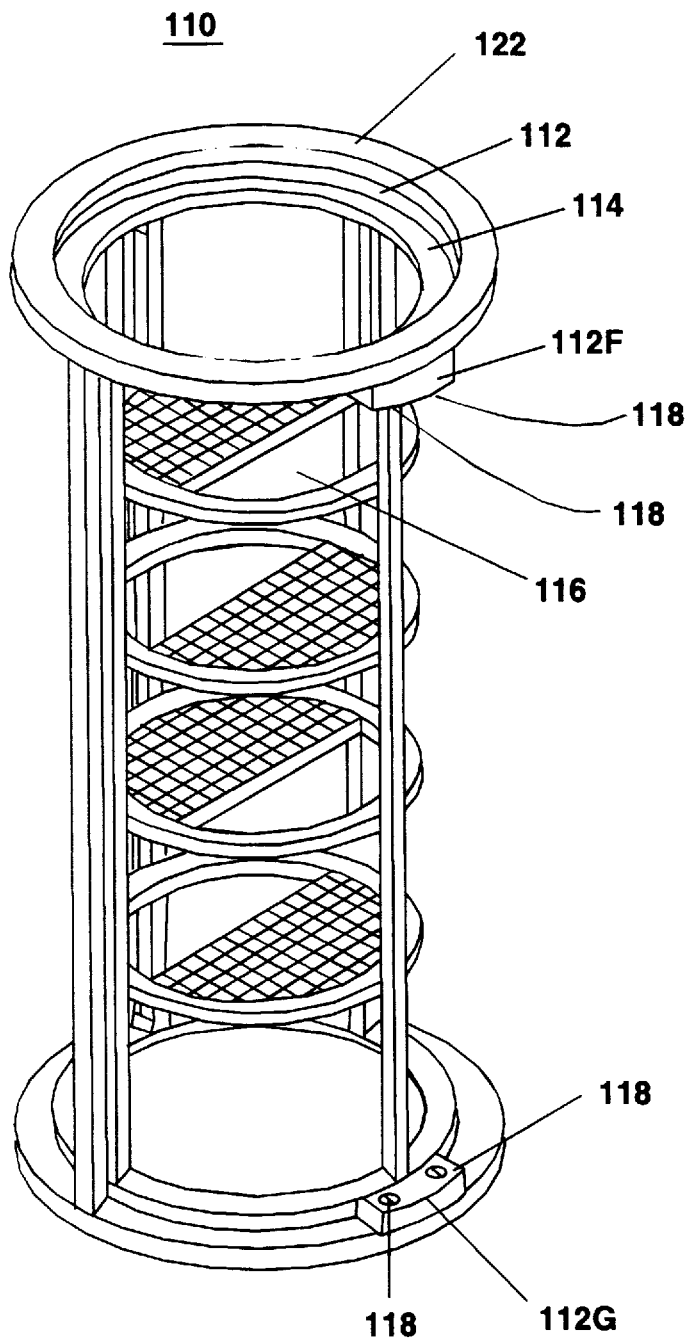
FIG. 10 is a perspective view of a pipe storm drain filter.

Lastly, referring to FIG. 10 which is a perspective view of a complete pipe storm drain filter (110). The pipe cage (112)

is securely attached to the pipe gasket (122). The pipe gasket (122) functions to seal the gap between the pipe cage (112) and the opening of a storm drain. The pipe rack (114) is securely retained in the pipe cage (112) at an upper end by the pipe rack upper retainer (112F) and at the lower end by the pipe rack lower retainer (112G). The upper end by the pipe rack upper retainer (112F) and pipe rack lower retainer (112G) by a plurality of fasteners (118). The pipe rack (114) functions to retain at least one pipe absorption filter (116).

It will be understood that each of the elements described above, or two or more together, may also find an useful application in other types of constructions differing from the type described above.

While the invention has been illustrated and described as embodied in a Storm Drain Filter, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A storm drain filter (10) functioning to remove selected substances from water flowing through a municipal storm drain, the storm drain filter (10) comprising:

A) an absorption filter (18) functioning to absorb selectable substances from a liquid, the absorption filter (18) comprises an absorption filter frame (18A) enclosing an absorption filter absorbing material (18B) between pairs of at least two absorption filter longitudinal retainers (18C) and at least two absorption filter transverse retainers (18D), the at least two absorption filter longitudinal retainers (18C) and at least two absorption filter transverse retainers (18D) function to retain the absorption filter absorbing material (18B) within the absorption filter frame (18A);

B) a tray (16) which functions to support the absorption filter (18), the tray (16) comprises a tray right side (16A) having at least one tray right side orifice (16AA) for liquid to flow therethrough, the tray right side (16A) having a front and back is securely attached to a right end of a tray rear (16B), the tray rear (16B) comprises at least one tray rear orifice (16BA) functioning to permit liquid to flow therethrough, the tray rear (16B) further comprises a tray rear fastener hole (16BB) which functions to receive a tray holddown means, a right end of the tray rear (16B) is securely attached to a rear end of a tray left side (16C) which comprises at least one tray left side orifice (16CA) functioning to permit liquid to flow therethrough, a front end of the tray left side (16C) is securely attached to a left end of a tray front (16D), the tray front (16D) comprises at least one tray front orifice (16DA) functioning to permit liquid to flow therethrough, the tray front (16D) further comprises at least one tray front fastener hole (16DB) which functions to receive a tray holddown means, a tray bottom (16E) constructed from a mesh material is securely attached at a peripheral edge to a lower edge of the tray right side (16A) and a lower edge of the tray left side (16C) and a lower edge of the tray front (16D) and a lower edge of the tray rear (16B), the at least one tray right side orifice (16AA) and at least one a tray rear orifice (16BA) and at least one tray left side orifice (16CA) and the at least one tray front orifice (16DA) function to permit a preselected volume of liquid to flow therethrough causing contaminants to be absorbed by the absorption filter (18), volume in excess of a preselected value overflow the upper edge of the tray right side (16A) and the tray rear (16B) and the tray left side (16C) and the tray front (16D) preventing the storm drain filter (10) from excessive restricting of liquid flow therethrough;

C) a rack (14) which functions to securely restrain at least two trays (16) in an alternating pattern, the rack (14) is inserted into a cage (12), the rack (14) comprises a rack top right side (14A) having a front end and rear end, securely attached to a right end of a rack top rear (14B), the left end of the rack top rear (14B) is securely attached to a rear end of a rack top left side (14C), a front end of the rack top left side (14C) is securely attached to a left end of a rack top front (14D), a right end of the a rack top front (14D) is securely attached to a front end of the rack top right side (14A), the rack top right side (14A) comprises a rack top rear handle (14BA) securely attached thereto functioning as a handhold when removing the rack (14) from the cage (12), the rack top front (14D) comprises a rack top front handle (14DA) securely attached thereto functioning as a handhold when removing the rack (14) from the cage (12), an upper end of a rack right front vertical member (14E) is securely attached to an intersection of the rack top right side (14A) and the rack top front (14D), a lower end of the rack right front vertical member (14E) is securely attached to a right end of a rack lower front (14F) and a front end of a rack lower right side (14O), a left end of the rack lower front (14F) is securely attached to a front end of a rack lower left side (14G) and lower end of a rack left front vertical (14H), the rack left front vertical (14H) is securely attached at an upper end to the left end of a rack top front (14D) and the front end of the rack top left side (14C), a rear end of the rack lower left side (14G) is securely attached to a lower end of a rack left rear vertical (14I) and a left end of a rack lower rear (14J), an upper end of the rack left rear vertical (14I) is securely attached to the left end of the rack top rear (14B) and the rear end of the rack top left side (14C), a right end of the rack lower rear (14J) is securely attached to a rear end of the rack lower right side (14O) and to a lower end of a rack right rear vertical (14K), an upper end of the rack right rear vertical (14K) is securely attached to the rear end of the rack top right side (14A) and the right end of rack top rear (14B), at least one right filter support means is securely attached between the rack right front vertical member (14E) and the rack right rear vertical (14K) and substantially parallel to the rack top right side (14A), at least one left filter support means is securely attached between the rack left front vertical (14H) and the rack left rear vertical (14I) and substantially parallel to the rack top left side (14C), further the alternating placement of the at least two trays (16) allows large debris to pass through the storm drain filter (10);

D) the cage (12) functions to receive the rack (14) therein, the cage (12) comprises a cage top right side (12A), the cage top right side (12A) back end is securely attached a right end of a cage top rear (12B), a left end of the cage top rear (12B) is securely attached to a back end of a cage top left side (12C), a front end of the cage top left side (12C) is securely attached to a left end of a cage top front (12D), a right end of the cage top front (12D) is securely attached to a front end of the cage top right side (12A), the front end of the cage top front (12D) is further securely attached to an upper end of a cage right front vertical member (12E), a lower end of the cage right front vertical member (12E) is securely attached to a right end of a cage lower front (12F), a left end of the cage lower front (12F) is securely connected to a front end of a cage lower left side (12G) and a lower end of a cage left front vertical (12H), an upper end of the cage left front vertical (12H) is securely attached to a left end of the cage top front (12D) and to a front end of the cage top left side (12C), a back end of the cage lower left side (12G) is securely attached to lower end of a cage left rear vertical (12I) and a left end of a cage lower rear (12J), a right end of the cage lower rear (12J) is securely attached to the back end of a cage lower right side (12P) and a lower end of a cage right rear vertical (12K), an upper end of the cage left rear vertical (12I) is securely attached to the left end of the cage top rear (12B) and the back end of a cage top left side (12C), a cage rear mid vertical member (12L) is securely attached at an upper end to a midpoint of the cage top rear (12B) and at a lower end to a midpoint of the cage lower rear (12J), a cage right mid vertical member (12M) is securely attached at an upper end to a midpoint of the cage top right side (12A) and at a lower end to a midpoint of the cage lower right side (12P), a cage front mid vertical member (12N) is securely attached at an upper end to a midpoint of the cage top front (12D) and at a lower end to a midpoint of the cage lower front (12F), a cage left mid vertical member (12O) is securely attached at an upper end to a midpoint of the cage top left side (12C) and at a lower end to a midpoint of the cage lower left side (12G), when the rack (14) is inserted into the cage (12) the cage rear mid vertical member (12L) and the cage right mid vertical member (12M) and the cage front mid vertical member (12N) and the cage left mid vertical member (12O) prevent the at least two trays (16) from dislodging; and E) a sealing means is securely attached to an upper perimeter of the cage (12) functioning to seal the interface between the cage (12) to a drain opening.

2. The storm drain filter (10) as described in claim 1, wherein the left filter support means is a rack left filter support (14L) which comprises a rack left filter support top flange (14LA) securely attached at one distal edge to a proximal edge of a rack left filter support vertical (14LB), the distal edge of the rack left filter support vertical (14LB) is securely attached to a proximal edge of a rack left filter support lower flange (14LC), the rack left filter support (14L) further comprises a rack left filter support stop (14LD), the rack left filter support (14L) functions to support the tray (16), the rack left filter support stop (14LD) function to limit the distance the tray (16) can be inserted, the rack left filter support (14L) functions to support a left end of the tray (16).

3. The storm drain filter (10) as described in claim 1, wherein the right filter support means is a rack right filter support (14M) which comprises a rack right filter support top flange (14MA) securely attached at one distal edge to a proximal edge of a rack right filter support vertical (14MB), the distal edge of the rack right filter support vertical (14MB) is securely attached to a proximal edge of a rack right filter support lower flange (14MC), the rack right filter support (14M) further comprises a rack right filter support stop (14MD), the rack right filter support stop (14MD) function to limit the distance the tray (16) can be inserted, the rack right filter support (14M) functions to support a right end of the tray (16).

4. The storm drain filter (10) as described in claim 1, wherein the sealing means is a gasket (22) which comprises a gasket front (22A) securely attached at an inner edge to a top edge of the cage top front (12D), and a gasket right (22B) securely attached at an inner edge to a top edge of the cage top right side (12A), and a gasket rear (22C) securely attached at an inner edge to a top edge of the cage top rear (12B), and a gasket left (22D) securely attached at an inner edge to a top edge of the cage top left side (12C).

5. The storm drain filter (10) as described in claim 1, wherein the hold down means is an absorption filter hold down (20) which comprises an absorption filter hold down head (20A) securely attached to one end of an absorption filter hold down shank (20B) having an aperture in an opposite end adapted to receive an absorption filter hold down clip (20C) therethrough.

6. A pipe storm drain filter (110) comprising:

A) a pipe absorption filter (116) which comprises a pipe absorption filter retaining rim (116A) securely enclosing pipe absorption filter absorption material (116B) having a pipe absorption filter edge (116E), the pipe absorption filter absorption material (116B) functions to remove selected substance from a liquid by absorption, the pipe absorption filter absorption material (116B) is securely restrained by at least one pipe absorption filter first cross member (116C) and at least one a pipe absorption filter second cross member (116D) oriented at right angles to each other, the pipe absorption filter absorption material (116B) is securely attached at an outer circumference to the pipe absorption filter retaining rim (116A) at an inner circumference, the pipe absorption filter absorption material (116B) extends partially across the pipe absorption filter retaining rim (116A), this functions to allow the pipe absorption filter (116) to be juxtaposed staggered by rotating the pipe absorption filter (116);

B) a pipe rack (114) functions to retain at least one pipe absorption filter (116) in an alternating pattern, the pipe rack (114) rack comprises a pipe rack upper end (114A) which is circular having a central aperture, the central aperture functions to receive a liquid flow, the pipe rack upper end (114A) is securely attached to an upper end of at least two pipe rack first vertical supports (114B), the pipe rack upper end (114A) comprises at least one first filter retainer which functions to retain at least one pipe absorption filter (116), a lower end of the at least two a pipe rack first vertical supports (114B) is securely attached to a pipe rack lower end (114E), the pipe rack lower end (114E) is circular having a central aperture, the central aperture functions to discharge a liquid flow, a pipe rack releasable vertical support (114F) comprises at least one fourth filter retainer, the pipe rack releasable vertical support (114F) is removably fastened at an upper end by an upper retainer (114GA) and at a lower end by a lower retainer (114GB), the upper retainer (114GA) is securely fastened to the a pipe cage upper end (112A) by at least one pipe cage fastening means, the lower retainer (114GB) is securely fastened to the pipe cage lower end (112E), by at least one pipe cage fastening means;

C) a pipe cage (112) which functions to retain the pipe rack (114) therein, the pipe cage (112) comprises a pipe cage upper end (112A) which is circular in configuration having a pipe cage upper end central aperture therein, the pipe cage upper end central aperture functions to receive a liquid flow, the pipe cage upper end (112A) is securely attached to the upper end of at least two pipe cage first vertical members (112B), the lower ends of the at least two pipe cage first vertical members (112B) are securely attached to a pipe cage lower end (112E), the pipe cage lower end (112E) which is a circular ring in configuration has a pipe cage upper end central aperture therein, the pipe cage lower end central aperture functions to discharge a liquid flow, the pipe rack (114) is retained within the pipe cage (112) by a pipe rack upper retainer (112F) which is securely attached to the pipe cage upper end (112A), the pipe rack (114) is further retained by a pipe rack lower retainer (112G) which is securely attached to a pipe cage lower end (112E); and D) a pipe sealing means securely attached to the perimeter of the pipe cage upper end (112A), the pipe sealing means functions to seal the pipe cage upper end (112A) to a pipe end.

7. The pipe storm drain filter (110) as described in claim 6, wherein the at least one first filter retainer is a pipe rack first vertical support first filter holder (114BA) which comprises pipe rack first vertical support first filter holder top flange (114BAA) having an inner edge securely attached to an upper edge of a pipe rack first vertical support first filter holder vertical (114BAB), a lower edge of the rack right filter support vertical (114BAB) is securely attached to an inner edge of a pipe rack first vertical support first filter holder lower flange (114BAC), the pipe rack first vertical support first filter holder (114BA) functions to removably retain a pipe absorption filter (116) between the first vertical support first filter holder top flange (114BAA) and the pipe rack first vertical support first filter holder lower flange (114BAC).

8. The pipe storm drain filter (110) as described in claim 6, wherein the at least one first filter retainer is a pipe rack releasable vertical support first filter holder (114FA) comprising a pipe rack releaseable vertical support first filter holder top flange (114FAA) having an inner edge securely attached to an upper edge of a pipe rack releaseable vertical support first filter holder vertical (114FAB), lower edge of the pipe rack releaseable vertical support first filter holder vertical (114FAB) is securely attached to inner edge of a pipe rack releaseable vertical support first filter holder bottom flange (114FAC), the pipe rack releaseable vertical support first filter holder (114FA) functions to removably retain a pipe absorption filter (116) between the pipe rack releaseable vertical support first filter holder top flange (114FAA) and the pipe rack releaseable vertical support first filter holder bottom flange (114FAC).

9. The pipe storm drain filter (110) as described in claim 6, wherein the fastening means comprises a fastener (118) selected from a group consisting of screws, bolts, clevis pins, quick pins, hook & loop, wire, and rivets.

10. The pipe storm drain filter (110) as described in claim 6, wherein the pipe rack releaseable vertical support fastening means comprises a retainer fastener (120) having a retainer fastener head (120A) securely attached at one distal end to a retainer fastener shank (120B), the retainer fastener shank (120B) comprises an aperture at an opposite distal end adapted to receive a retainer fastener clip (120C).

11. The pipe storm drain filter (110) as described in claim 6, wherein the pipe sealing means comprises a pipe gasket (122).

12. The pipe storm drain filter (10) as described in claim 11, wherein the pipe gasket (122) is selected from a group consisting of rubber, glue, epoxy, expandable foam, polyurethane, plastic, metal, metal alloy, concrete, and plastic composite.

13. The pipe storm drain filter (110) as described in claim 6, wherein the at least one pipe cage fastening means is selected from a group consisting of screws, welding, bolts, hook and loop, glue, and heat bonding.

* * * * *